(12) United States Patent
Kodama et al.

(10) Patent No.: US 6,611,381 B2
(45) Date of Patent: Aug. 26, 2003

(54) DISPLAY ELEMENT, POLARIZING PLATE, AND DISPLAY APPARATUS AND PROJECTING APPARATUS USING THE DISPLAY ELEMENT AND POLARIZING PLATE

(75) Inventors: Hiroyuki Kodama, Tokyo (JP); Atsushi Okuyama, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/748,678

(22) Filed: Dec. 22, 2000

(65) Prior Publication Data

US 2001/0021002 A1 Sep. 13, 2001

(30) Foreign Application Priority Data

Dec. 28, 1999  (JP) ............................................ 11-372597

(51) Int. Cl.$^7$ .............................................. G02B 27/10
(52) U.S. Cl. ........................................ 359/619; 359/618
(58) Field of Search ................................ 359/618, 619, 359/620, 621, 622, 623, 634; 353/31, 34, 37

(56) References Cited

U.S. PATENT DOCUMENTS 5,582,879 A * 12/1996 Fujimura et al. ............ 427/561
6,212,013 B1 * 4/2001 Kodama et al. ............. 359/634
6,431,727 B1 * 8/2002 Sugawara et al. ........... 359/618
6,476,968 B1 * 11/2002 Kato et al. .................. 359/565

FOREIGN PATENT DOCUMENTS

JP          411337919    * 12/1999    ......... G02F/1/1333

* cited by examiner

Primary Examiner—Hung Xuan Dang
(74) Attorney, Agent, or Firm—Morgan & Finnegan, L.L.P.

(57) ABSTRACT

This invention provides a liquid crystal display apparatus which can reduce thermal load on a polarizing plate or display element, decrease the number of components necessary for reducing the thermal load on the polarizing plate, and reduce cost by decreasing the power consumption of a cooling fan. The display apparatus has a unit for changing the color purity of at least one of a puerility of colors. A polarizing plate in the optical path of light whose color purity is changed by the color purity changing unit is formed from a heat-transfer transparent substrate having a thermal conductivity of 1.2 W/(m·K) or more.

67 Claims, 14 Drawing Sheets

OPTICAL ELEMENT 13

DICHROIC MIRROR (DM1)

DICHROIC MIRROR (DM2)

STATE UPON INSERTION OF OPTICAL ELEMENT (13)

STATE WITHOUT INSERTION OF OPTICAL ELEMENT (13)

DICHROIC MIRROR (DM1)

DICHROIC MIRROR (DM2)

OPTICAL ELEMENT 13

STATE UPON INSERTION OF OPTICAL ELEMENT (13)

STATE WITHOUT INSERTION OF OPTICAL ELEMENT (13)

DISPLAY ELEMENT, POLARIZING PLATE, AND DISPLAY APPARATUS AND PROJECTING APPARATUS USING THE DISPLAY ELEMENT AND POLARIZING PLATE

BACKGROUND OF THE INVENTION

1. Field of the Invention

The present invention relates to a display apparatus and a projecting apparatus used to display, e.g., a computer image or video image on a large screen.

2. Related Background Art

In recent years, demand has arisen for a projection-type display apparatus with improved brightness. FIG. 15 shows the arrangement of a conventional projection-type display apparatus. Referring to FIG. 15, white light emitted from a light source section 1 passes through fly-eye lenses 3 and 4, PS conversion element 5, and condenser lens 6. A dichroic mirror DM1 transmits a red-band light component and reflects green- and blue-band light components. As the light source, generally, a halogen lamp, metal halide lamp, ultrahigh-pressure mercury-vapor lamp, or the like is used. As a color separation/synthesis optical element, a dichroic mirror, dichroic prism, or the like is used.

The red-band light component transmitted through the dichroic mirror DM1 that exhibits a spectral transmittance shown in FIG. 16A changes its optical path by 90° at a total-reflecting mirror M1, strikes a liquid crystal display element 8R through a field lens 7R and a trimming filter TR that exhibits a spectral transmittance shown in FIG. 16C, and is optically modulated here in accordance with the input signal. The optically modulated light component becomes incident on a dichroic prism 9, changes its optical path by 90° at the dichroic prism 9, and strikes a projecting lens 10.

On the other band, the green- and blue-band light components reflected by the dichroic mirror DM1 to change the optical paths by 90° become incident on a dichroic mirror DM2 that exhibits a spectral transmittance shown in FIG. 16B. As is apparent from FIG. 16B, since the dichroic mirror DM2 has a characteristic for reflecting the green-band light component, the green-band light component is reflected to change its optical path by 90°, becomes incident on a liquid crystal display element 8G through a field lens 7G and a trimming filter TG that exhibits a spectral transmittance shown in FIG. 16D, and is optically modulated here in accordance with the input signal. The optically modulated green-band light component strikes the dichroic prism 9 and projecting lens 10 in this order.

The blue-band light component transmitted through the dichroic mirror DM2 becomes incident on a liquid crystal display element 8B through a condenser lens 11, relay lens 12, total-reflecting mirrors M2 and M3, and field lens 7B, and is optically modulated here in accordance with the input signal. The optically modulated blue-band light component strikes the dichroic prism 9 to change its optical path by 90° at the dichroic prism 9, and then strikes the projecting lens 10.

In the conventional projection-type display apparatus having the above arrangement, polarizing plates necessary before and after the liquid crystal display element 8 are stuck to a transparent glass member such as the protective glass member used for the liquid crystal display element 8, the field lens 7, or the dichroic prism 9.

When the aperture ratio of the liquid crystal display element is low, and the light quantity of the lamp used is small, a transparent glass substrate (thermal conductivity: about 1 W/(m·K)) suffices, as in the prior art.

The brightness of a screen is recently improved by using a 1.3-type liquid crystal display element having about 770,000 pixels and an aperture ratio of 60% or increasing the power consumption of the lamp. Additionally, liquid crystal display elements are becoming compact.

However, this increases the thermal load on the polarizing plate necessary for the liquid crystal display element, posing another problem of degradation in performance of the polarizing plate.

In addition, when display with priority on the brightness and display with priority on the color reproducibility are realized by a single apparatus, as disclosed in Japanese Patent Application Laid-Open No. 7-72450, the polarizing plate has larger thermal load because display with priority on the brightness uses a wavelength region (about 570 to 600 nm) that is not used for display with priority on the color reproducibility.

To solve the thermal load on the polarizing plate, sapphire (42 W/(m·K)) having a thermal conductivity about 40 times that of a transparent glass substrate is used as the substrate of the polarizing plate, as disclosed in Japanese Patent Application Laid-Open No. 11-231277. However, if the problem of thermal load is solved simply using sapphire, a 3-CCD projection-type display apparatus as shown in FIG. 15 or a projection-type display apparatus that realizes, by a single apparatus, display with priority on the brightness and display with priority on the color reproducibility, as disclosed in Japanese Patent Application Laid-Open No. 11-231277, requires a total of six sapphire substrates, resulting in large increase in cost.

When the cooling efficiency is increased using a cooling fan, the power consumption of the cooling fan increases. Especially, when display with priority on the brightness and display with priority on the color reproducibility are realized by a single apparatus, as disclosed in Japanese Patent Application Laid-Open No. 7-72450, it is not preferable because cooling must be set in consideration of display with priority on the brightness, where the light quantity increases, while cooling is wasteful for display with priority on the color reproducibility.

The power consumption of the cooling fan may be changed between display with priority on the brightness and display with priority on the color reproducibility. However, a system for switching the power consumption must be incorporated, resulting in an increase in cost or space.

SUMMARY OF THE INVENTION

It is therefore an object of the present invention to provide a display apparatus which has a means for changing the color purity of at least one of a plurality of color light components, in changing the color purity of at least one color light component, can reduce the thermal load on the polarizing plate, and can reduce the cost by decreasing the power consumption of a cooling fan.

In one aspect of the invention, a display apparatus for forming a color image by illuminating one or a plurality of display elements with light from a light source and modulating a plurality of color light components having different colors by the display elements, comprises means for changing a color purity of at least one of the plurality of color light components, and a polarizing plate in an optical path of the light component whose color purity is changed by said color purity changing means, wherein said polarizing plate has a transparent substrate including a material having a thermal conductivity higher than 2 W/(m·K).

In another aspect of the invention, said color purity changing means can adjust whether a light component in a specific wavelength region reaches the display element.

In another aspect of the invention, the light source has a peak at a certain wavelength of the specific wavelength region.

In another aspect of the invention, the certain wavelength is 570 to 600 nm.

In another aspect of the invention, the light source comprises a high-pressure mercury-vapor lamp, and the certain wavelength is about 580 nm.

In another aspect of the invention, said color purity changing means comprises a dichroic mirror.

In another aspect of the invention, the transparent substrate is essentially made of one of sapphire and fluorite.

In another aspect of the invention, the transparent substrate includes a material having a thermal conductivity higher than 5 W/(m·K).

In another aspect of the invention, the transparent substrate is essentially made of a material having a thermal conductivity higher than 2 W/(m·K).

In another aspect of the invention, the display apparatus further comprises a plurality of dichroic mirrors for separating white light from the light source into the plurality of color light components having different colors.

In another aspect of the invention, the display apparatus further comprises a plurality of image elements arranged in correspondence with the plurality of color light components having different colors, and a plurality of dichroic mirrors for combining image light components from the plurality of display elements.

In another aspect of the invention, the display apparatus further comprises a plurality of display elements arranged in correspondence with the plurality of color light components having different colors, and a dichroic prism for combining image light components from the plurality of display elements for modulating the plurality of color light components.

In another aspect of the invention, said dichroic prism is formed by bonding four prisms using an adhesive to have wavelength selection/reflection layers substantially perpendicular to each other.

In another aspect of the invention, said color purity changing means inserts/removes an optical element to/from an optical path of at least one of the plurality of color light components or changes a posture of the optical element.

A projecting apparatus according to one aspect of the invention comprises the display apparatus set out in the foregoing, and a projection system for enlarging and projecting an image formed by the display apparatus.

In another aspect of the invention, a display apparatus for forming a color image by illuminating one or a plurality of display elements with light from a light source and modulating a plurality of color light components having different colors by the display elements, comprises means for changing a color purity of at least one of the plurality of color light components, wherein one of the one or plurality of display elements is in an optical path of the light component whose color purity is changed by said color purity changing means, and said one display element has a transparent substrate essentially made of a material having a thermal conductivity higher than 2 W/(m·K).

In another aspect of the invention, a display apparatus comprises a light source, one or a plurality of display elements illuminated with light from said light source, said display elements forming an image by modulating a plurality of color light components having different colors, and one or a plurality of polarizing plates arranged in an optical path of the light from said light source to equalize polarizing directions of the light components, wherein at least one of said one or the plurality of polarizing plates has a transparent substrate essentially formed from a fluorite.

In another aspect of the invention, the foregoing apparatus further comprises means for changing a color purity of at least one of the plurality of color light components by inserting/removing an optical element to/from an optical path of said at least one color light component or changing a posture of the optical element in the optical path of said at least one color light component.

In another aspect of the invention, said color purity changing means can adjust whether a light component in a specific wavelength region reaches the display element.

In another aspect of the invention, the light source has a peak at a certain wavelength of the specific wavelength region.

In another aspect of the invention, the certain wavelength is 570 to 600 nm.

In another aspect of the invention, the light source comprises a high-pressure mercury-vapor lamp, and the certain wavelength is about 580 nm.

In another aspect of the invention, said color purity changing means comprises a dichroic mirror.

In another aspect of the invention, the transparent substrate includes a material having a thermal conductivity higher than 5 W/(m·K).

In another aspect of the invention, the transparent substrate is essentially made of a material having a thermal conductivity higher than 2 W/(m·K).

In another aspect of the invention, the foregoing apparatus further comprises a plurality of dichroic mirrors for separating white light from the light source into the plurality of color light components having different colors.

In another aspect of the invention, the foregoing apparatus further comprises a plurality of image elements arranged in correspondence with the plurality of color light components having different colors, and a plurality of dichroic mirrors for combining image light components from the plurality of display elements.

In another aspect of the invention, the foregoing apparatus further comprises a plurality of display elements arranged in correspondence with the plurality of color light components having different colors, and a dichroic prism for combining image light components from the plurality of display elements for modulating the plurality of color light components.

In another aspect of the invention, said dichroic prism is formed by bonding four prisms using an adhesive to have wavelength selection/reflection layers substantially perpendicular to each other.

In another aspect of the invention, a projecting apparatus comprises the foregoing display apparatus and a projection system for enlarging and projecting an image formed by said display apparatus.

In another aspect of the invention, a display apparatus comprises a light source, one or a plurality of display elements illuminated with light from said light source, said display elements forming an image by modulating a plurality of color light components having different colors, wherein at least one of said one or said plurality of display elements having a transparent substrate is essentially formed from a fluorite.

In another aspect of the invention, the foregoing apparatus further comprises means for changing a color purity of at least one of the plurality of color light components by inserting/removing an optical element to/from an optical path of the at least one color light component or changing a posture of the optical element in the optical path of the at least one color light component.

In another aspect of the invention, said color purity changing means can adjust whether a light component in a specific wavelength region reaches the display element.

In another aspect of the invention, the light source has a peak at a certain wavelength of the specific wavelength region.

In another aspect of the invention, the certain wavelength is 570 to 600 nm.

In another aspect of the invention, the light source comprises a high-pressure mercury-vapor lamp, and the certain wavelength is about 580 nm.

In another aspect of the invention, said color purity changing means comprises a dichroic mirror.

In another aspect of the invention, the transparent substrate includes a material having a thermal conductivity higher than 5 W/(m·K).

In another aspect of the invention, the transparent substrate is essentially made of a material having a thermal conductivity higher than 2 W/(m·K).

In another aspect of the invention, the foregoing apparatus further comprises a plurality of dichroic mirrors for separating white light from the light source into the plurality of color light components having different colors.

In another aspect of the invention, the foregoing apparatus further comprises a plurality of image elements arranged in correspondence with the plurality of color light components having different colors, and a plurality of dichroic mirrors for combining image light components from the plurality of display elements.

In another aspect of the invention, the foregoing apparatus further comprises a plurality of display elements arranged in correspondence with the plurality of color light components having different colors, and a dichroic prism for combining image light components from the plurality of display elements for modulating the plurality of color light components.

In another aspect of the invention, said dichroic prism is formed by bonding four prisms using an adhesive to have wavelength selection/reflection layers substantially perpendicular to each other.

In another aspect of the invention, a projecting apparatus comprises the foregoing display apparatus and a projection system for enlarging and projecting an image formed by said display apparatus.

In another aspect of the invention, a display element comprises a transparent substrate essentially formed from fluorite, and a driving section formed on said substrate.

In another aspect of the invention, a polarizing plate for equalizing polarizing directions of incident light components and outputting the light components, comprises a transparent substrate essentially formed from fluorite and a polarizing film formed on said substrate.

DESCRIPTION OF THE PREFERRED EMBODIMENTS

The embodiments will be described next in detail in accordance with the accompanying drawings. In these embodiments, an optical element having characteristics for transmitting a region of a certain wavelength or more and inhibiting a region of the wavelength or less, or vice versa is placed in the optical path, and a mechanism for inserting/removing the optical element is prepared, thereby realizing display with priority on the brightness and display with priority on the color reproducibility by a single projecting apparatus.

In addition, when the substrate of a display element or polarizing plate is formed from a material having a thermal conductivity higher than that of transparent glass (thermal conductivity: about 1 W/(m·K)) often used as the substrate of a display element or polarizing plate, e.g., sapphire having a thermal conductivity of about 42 W/(m·K) or fluorite having a thermal conductivity of about 10 W/(m·K), the thermal load on the polarizing plate or display element in display with priority on the brightness can be relaxed. Furthermore, when a display element or polarizing plate formed from a transparent heat-transfer substrate having a thermal conductivity (thermal conductivity: 2 W/(m·K) or more) higher than that of the transparent glass is used as the substrate of a display element in the optical path where the optical element is inserted or removed or a polarizing plate before or after the display element, and a display element or polarizing plate formed from transparent glass is used in the remaining optical paths, the number of expensive heat-transfer transparent substrates can be decreased to reduce the cost. Note that a more satisfactory effect can be obtained when a transparent heat-transfer substrate having a thermal conductivity of 5 W/(m·K) or more, that is obviously higher than that of the transparent glass (thermal conductivity: 1 W/(m·K)), is used as the substrate of a display element or polarizing plate.

In all embodiments, sapphire having a high thermal conductivity is used as the substrate of a polarizing plate with display with thermal load. However, the present invention is not limited to this, and fluorite may be used in place of sapphire, or any other materials having high thermal conductivities can be used. The sapphire may be used not as the substrate of a polarizing plate but as the substrate of a display element. Other members with large thermal load may also be formed from sapphire or fluorite. Also, instead of forming the substrate from a single material such as sapphire or fluorite, the substrate can be made of a plurality of materials including transparent glass (thermal conductivity: 1 W/(m·K)) as long as at least one of the plurality of materials has a high thermal conductivity.

First Embodiment

Figure 1:
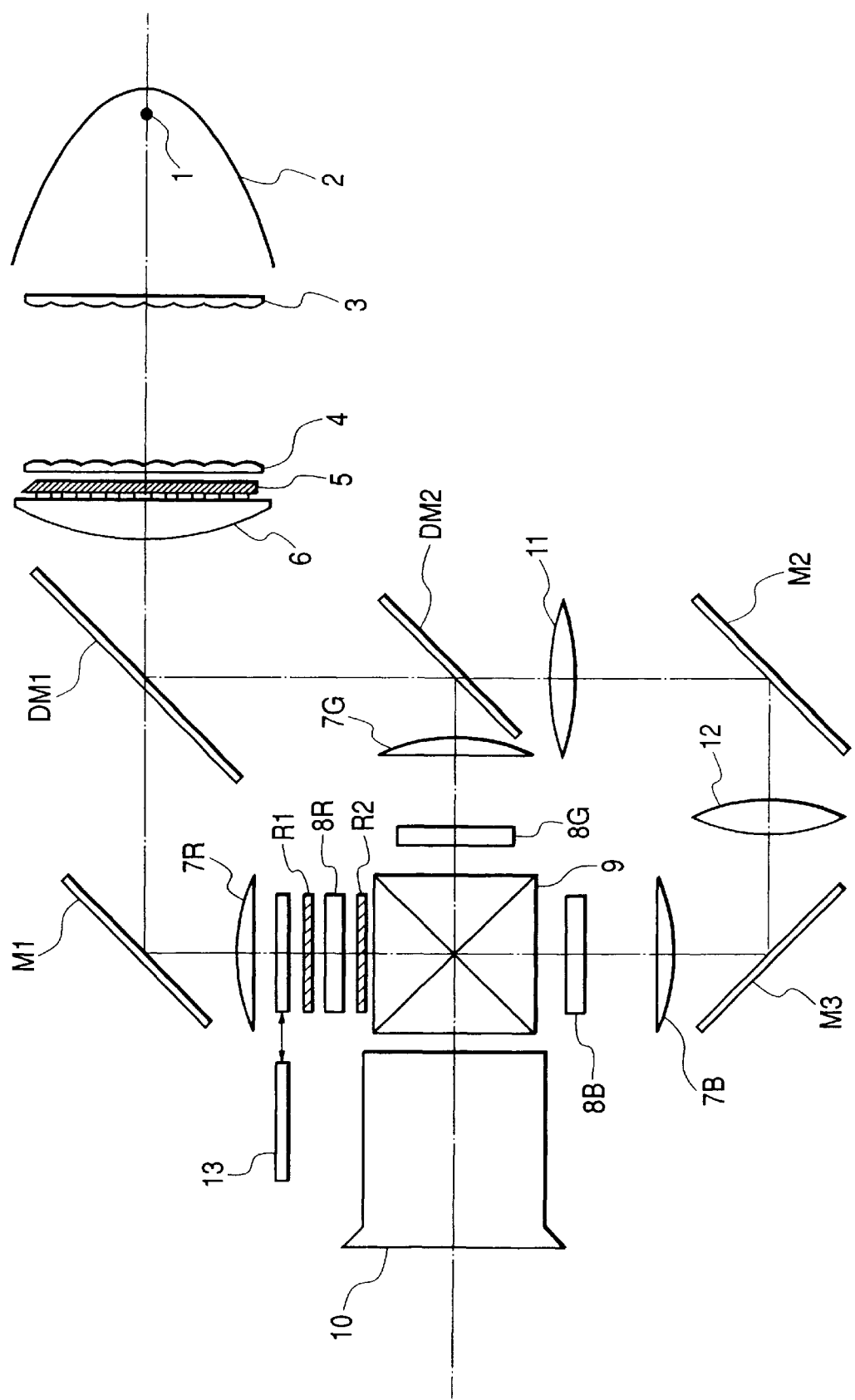
FIG. 1 is a view showing the arrangement of a projecting apparatus according to the first embodiment.
Figure 2:
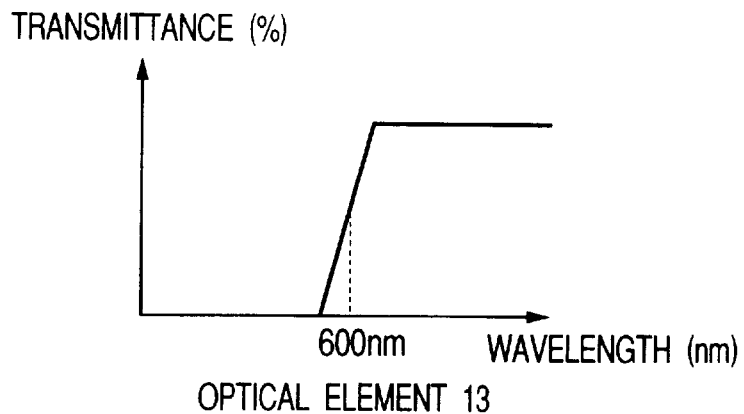
FIG. 2 is a graph showing the wavelength spectral characteristic of an optical element 13 according to the first embodiment.
Figure 3A:
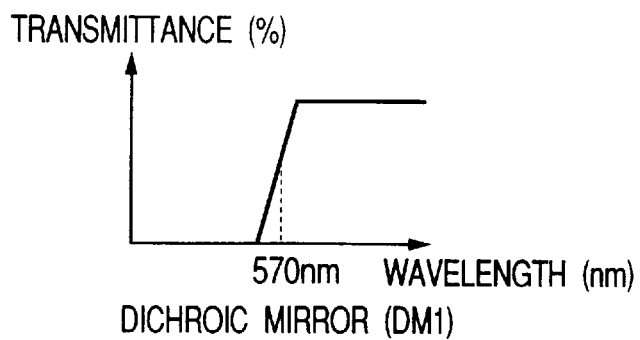
FIGS. 3A and 3B are graphs showing the wavelength spectral characteristics of dichroic mirrors according to the first embodiment.
Figure 3B:
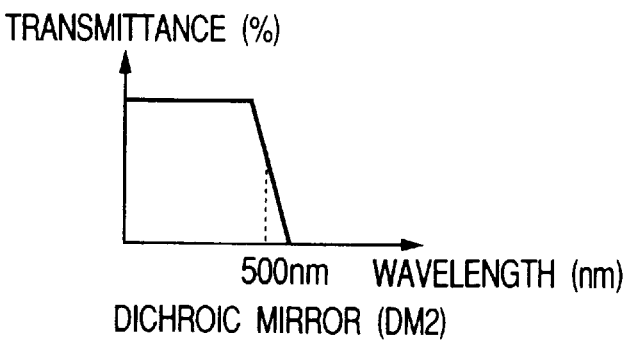

FIG. 1 shows the detailed arrangement of a projection-type display apparatus according to the first embodiment of the present invention. FIG. 2 shows the spectral transmittance of an optical element 13 used in this embodiment. FIGS. 3A and 3B show the spectral transmittances of dichroic mirrors DM1 and DM2 in the above arrangement. These spectral transmittances are design examples when a certain ultrahigh-pressure mercury-vapor lamp is used. These numerical values are merely examples and are not limited to these values. Various values can be set in accordance with the type of light source.

A red-band light component transmitted through the dichroic mirror DM1 that exhibits the spectral transmittance shown in FIG. 3A changes its optical path at a total-reflecting mirror M1 by 90° and passes through a field lens 7R. When the optical element 13 is inserted into the optical path, the red-band light component passes through the optical element 13, becomes incident on a sapphire polarizing plate R1 and liquid crystal display element 8R, and is optically modulated here in accordance with the input signal.

The optically modulated light component strikes a sapphire polarizing plate R2 and dichroic prism 9 in this order, changes its optical path by 90° at the dichroic prism 9, and enters a projecting lens 10. When the optical element 13 is not present in the optical path, the light component becomes incident on the liquid crystal display element 8R without intervening the optical element 13 and is optically modulated here in accordance with the input signal. The optically modulated light component becomes incident on the dichroic prism 9, changes its optical path by 90° at the dichroic prism 9, and enters the projecting lens 10. The dichroic prism 9 here is designed by bonding four prisms using an adhesive such that the wavelength selection/reflection layers form an almost cross shape.

On the other hand, green- and blue-band light components reflected by the dichroic mirror DM1 to change the optical paths by 90° strike the dichroic mirror DM2 that exhibits the spectral transmittance shown in FIG. 3B. As is apparent from FIG. 3B, since the dichroic mirror DM2 has a characteristic for reflecting green band light G, the green-band light component is reflected to change its optical path by 90°, becomes incident on a liquid crystal display element 8G through a field lens 7G, and is optically modulated here in accordance with the input signal. The optically modulated green-band light component strikes the dichroic prism 9 and projecting lens 10 in this order.

The blue-band light component transmitted through the dichroic mirror DM2 becomes incident on a liquid crystal display element 8B through a condenser lens 11, relay lens 12, total-reflecting mirrors M2 and M3, and field lens 7B, and is optically modulated here in accordance with the input signal. The optically modulated blue-band light component strikes the dichroic prism 9 to change its optical path by 90° at the dichroic prism 9, and then strikes the projecting lens 10.

When the optical element 13 is not inserted into the irradiation optical path, although the color purity determined by the cut wavelength of the dichroic mirrors DM1 and DM2 is lower than the color purity necessary for natural image display, the display is bright, so a color purity sufficient for presentation in, e.g., an office or school is set. When the optical element 13 is not inserted into the irradiation optical path, a light component in a band of about 570 to 600 nm is also used as projection light.

Conversely, when high-quality display with high color purity is necessary for natural image display or the like, the optical element 13 is inserted into the irradiation optical path. When the optical element 13 is inserted into the irradiation optical path, a light component in the band of about 570 to 600 nm does not emerge to the liquid crystal display element side. Instead, a light component in a band of about 510 to 570 nm is used as a green-band display light component, and projection light of about 600 nm or more is used as a red-band display light component.

Figure 4A:
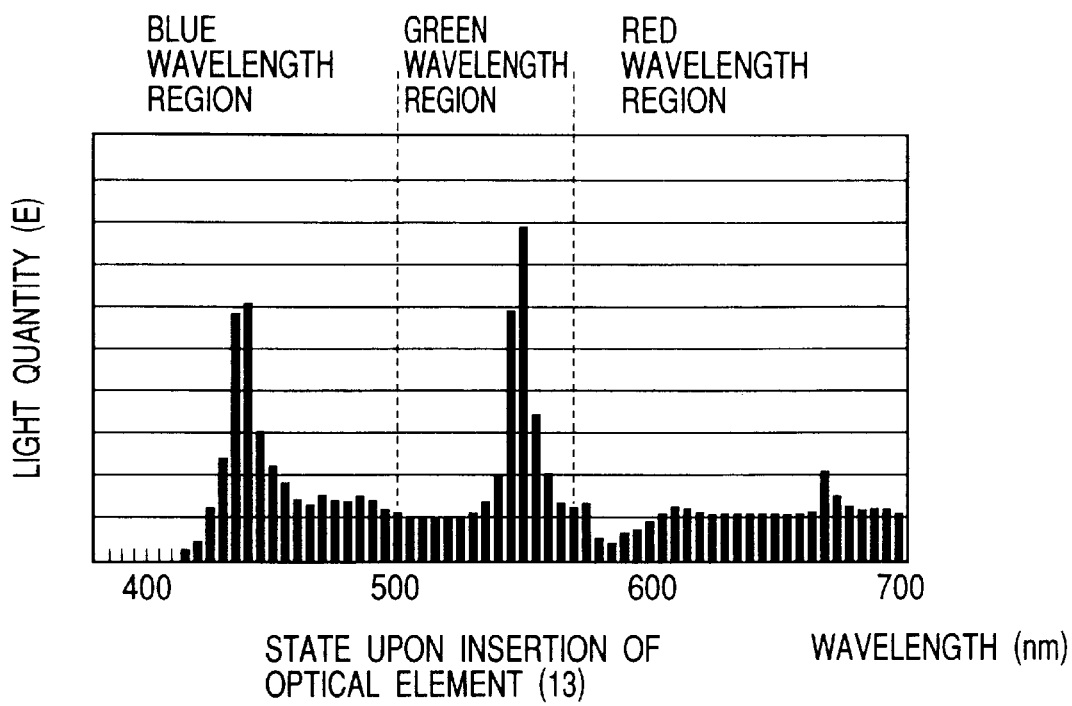
FIGS. 4A and 4B are graphs showing spectrum distributions in states upon and without insertion of the optical element 13 according to the first embodiment.
Figure 4B:
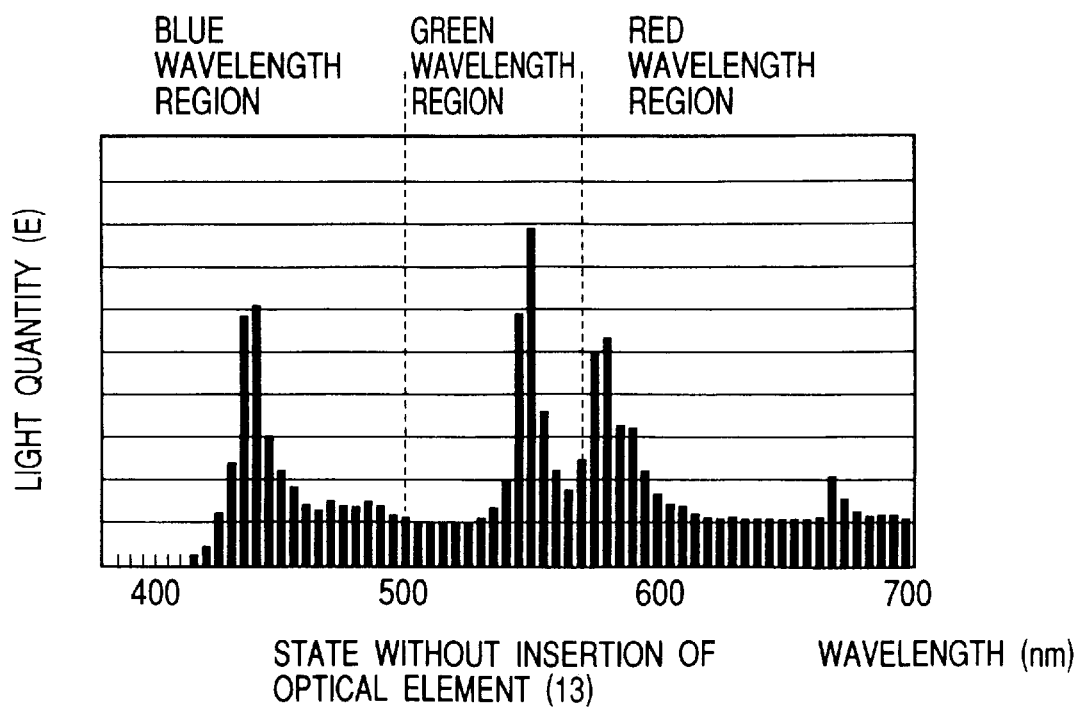

FIGS. 4A and 4B show the spectrum characteristics in states upon and without insertion of the optical element 13. When the optical element 13 is inserted into the irradiation optical path, and a light component in the band of 570 to 600 nm is not used, the color purity can improve. Generally, however, when a light component that lowers the color purity is shielded, the light quantity decreases, although the color purity improves. For the optical element 13, the cut band and transmittance are set such that the color purity and color balance can be ensured without greatly decreasing the light quantity.

In the arrangement shown in FIG. 1, only the light component in the red wavelength region changes its light quantity, as shown in FIGS. 4A and 4B. Hence, transparent glass is used as the substrates of the polarizing plates in the blue and green wavelength regions, cooling by a cooing fan is done mainly for the blue and green wavelength regions, and sapphire is used as the substrate of the polarizing plate in the red wavelength region where the light quantity changes, the thermal load on the polarizing plates in the respective wavelength regions can be relaxed. In addition, since the number of sapphire substrates decreases, the cost can be reduced. Furthermore, since cooling by the cooling fan need only be mainly done for the blue and green wavelength regions where the light quantity does not change, the power consumption and size of the fan can reduced, and the problem of noise is also relaxed.

Figure 5:
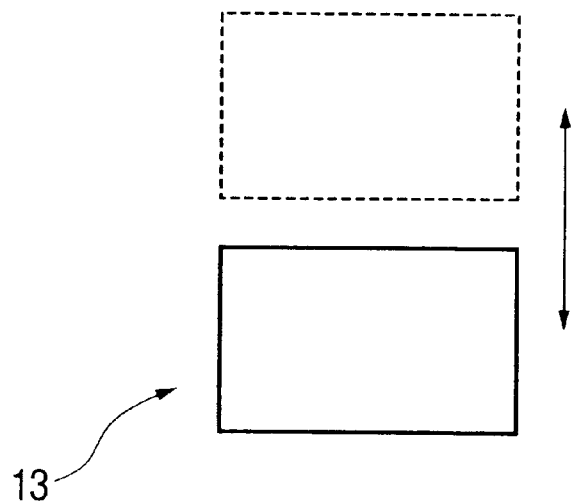
FIG. 5 is a view showing the operation direction (vertical) of the optical element 13 according to the first embodiment.
Figure 6:
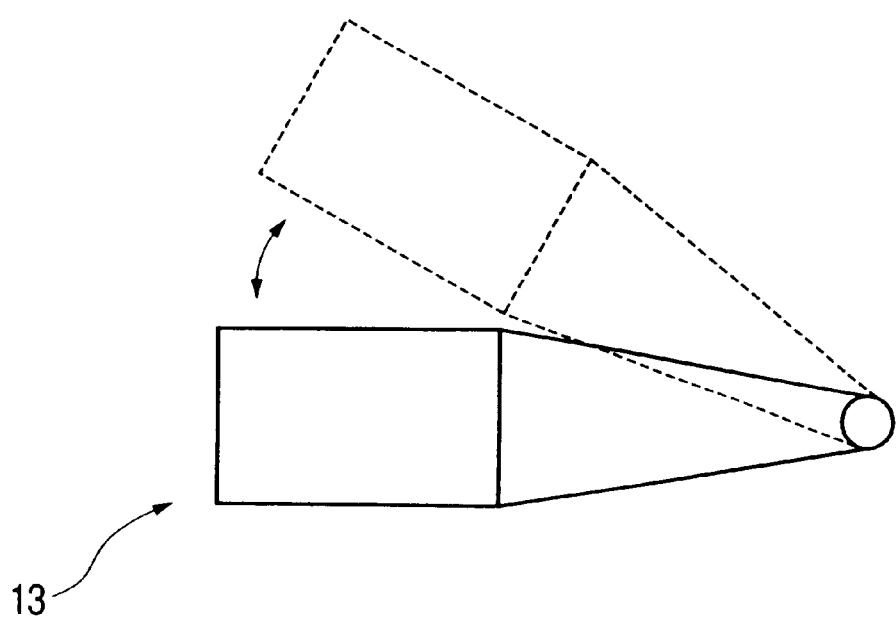
FIG. 6 is a view showing the operation direction (arc) of the optical element 13 according to the first embodiment.

Referring to FIG. 1, the optical element 13 is placed immediately before the liquid crystal display element in the red wavelength optical path. However, the optical element 13 can be placed at any position between the dichroic mirror DM1 and the liquid crystal display element in the red wavelength optical path. Referring to FIG. 1, the optical element is moved horizontally. However, the optical element may be moved vertically as shown in FIG. 5 or circularly moved about a certain point as shown in FIG. 6 to be inserted/removed into/from the optical path. The operation directions of the optical element 13 are not limited to these directions. Instead of inserting/removing the optical element 13, it may be operated to make an angle with respect to the optical axis using the fact that the cut wavelength of the dichroic mirror is shifted to the short wavelength side when the light incident angle is increased.

The spectral wavelength characteristics of the dichroic mirror DM1 are not limited to these characteristics. A plurality of optical elements may be used in accordance with the characteristics.

Figure 17:
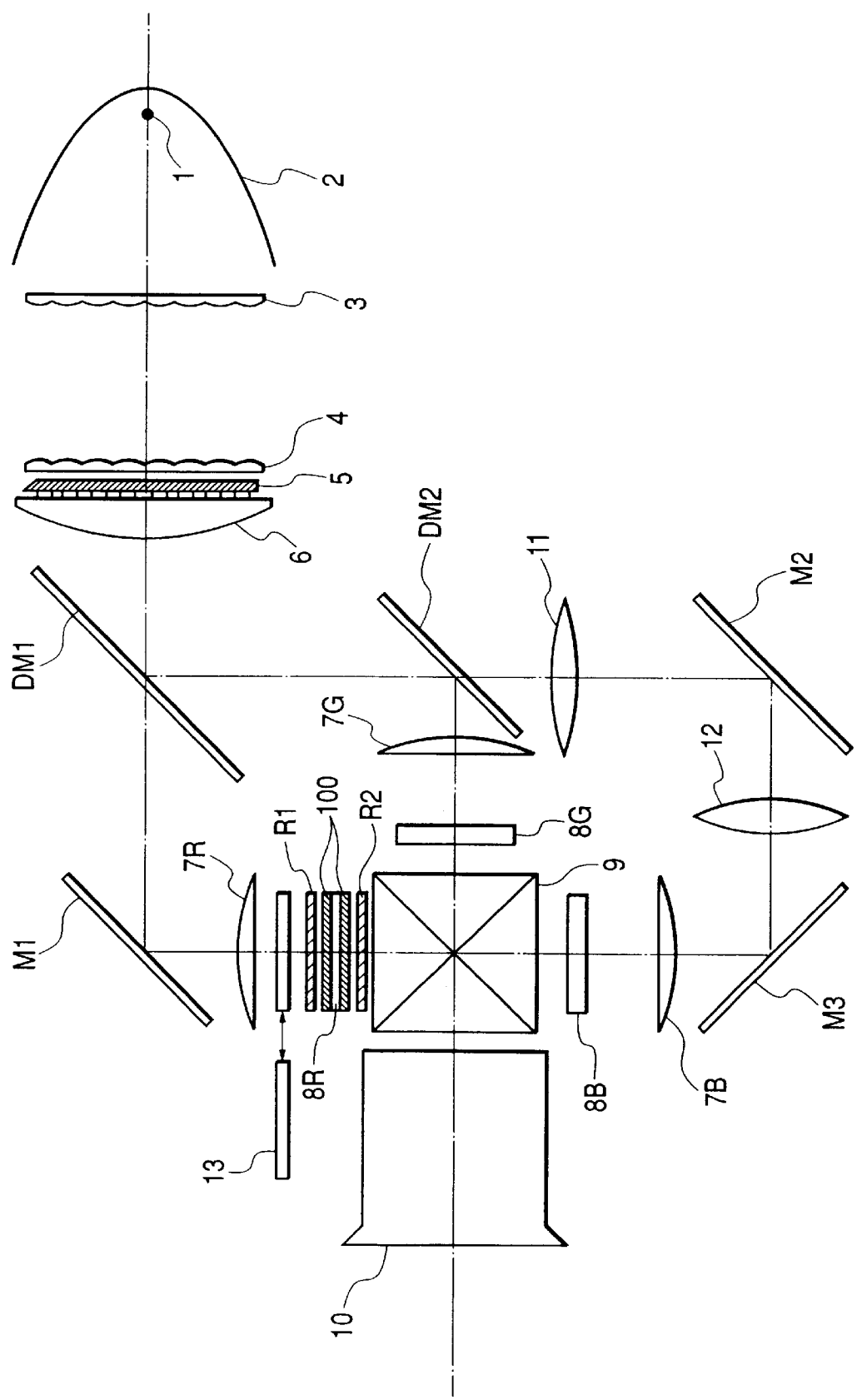
FIG. 17 is a view showing the arrangement of a projecting apparatus using a sapphire substrate according to the first embodiment as a display element.

Referring to FIG. 1, two sapphire substrates are used as the substrates of polarizing plates. However, the number of substrates is not limited to two. In addition, not sapphire but another material such as fluorite having a high thermal conductivity may be used. Furthermore, as shown in FIG. 17, instead of using a substrate 100 formed from a material such as sapphire or fluorite having a high thermal conductivity as the substrate of a polarizing plate, the substrate may be integrated with a display element. In this case, sapphire or fluorite can be used for both of the substrate of a polarizing plate and the display element or selectively used for only an optimum one of the polarizing plate and display element.

Second Embodiment

Figure 7:
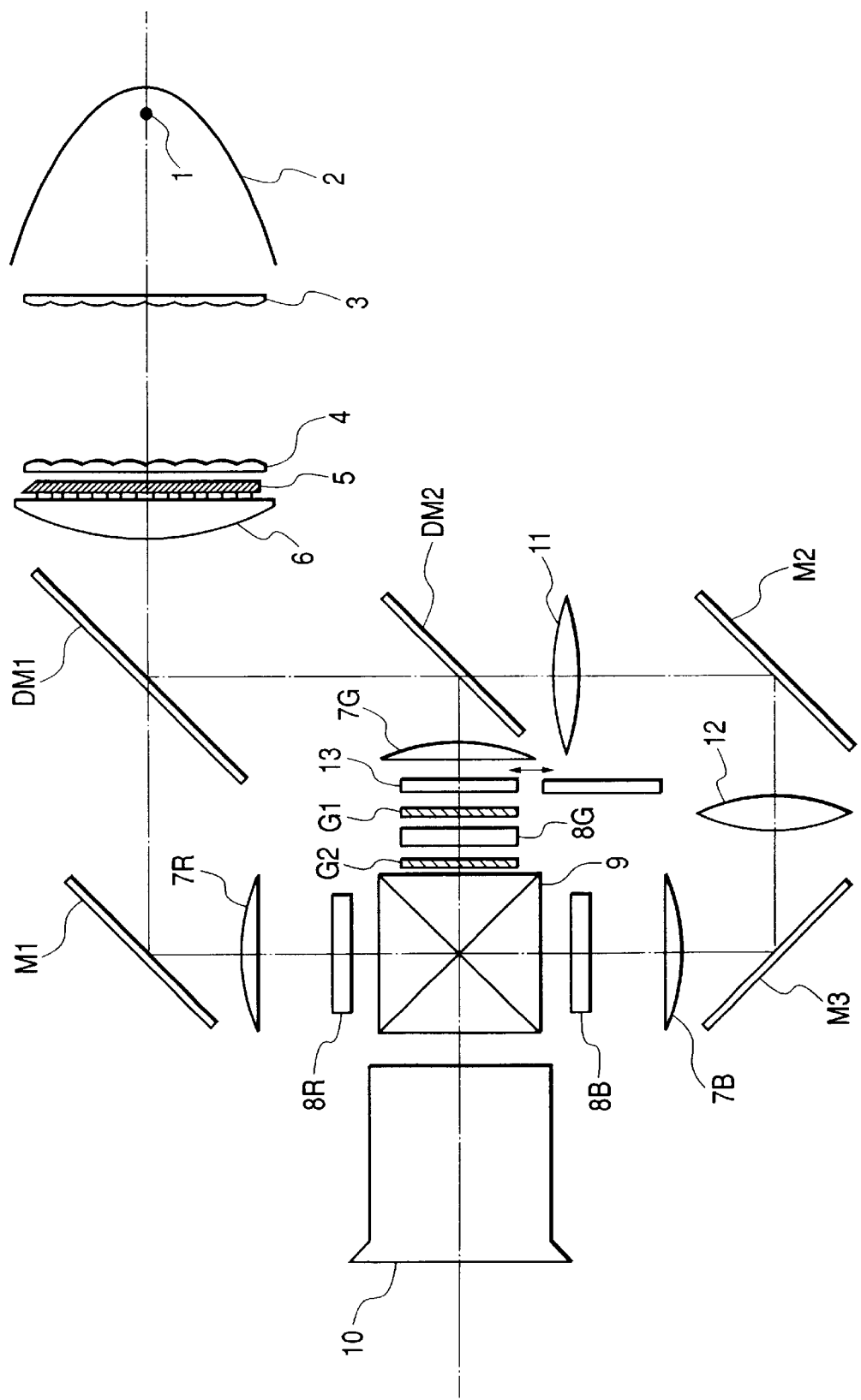
FIG. 7 is a view showing the arrangement when an optical element is placed in a green wavelength optical path in the second embodiment.
Figure 8A:
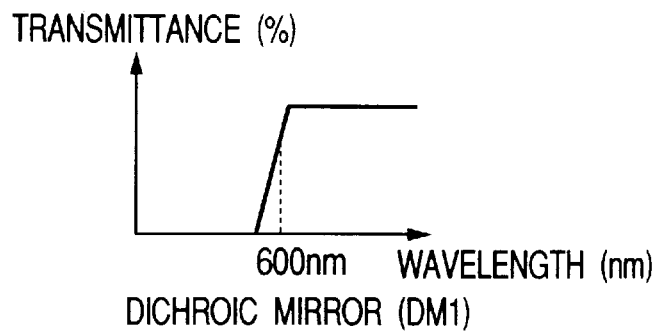
FIGS. 8A, 8B, and 8C are graphs showing the wavelength spectral characteristics of dichroic mirrors and optical element 13 according to the second embodiment.
Figure 8B:
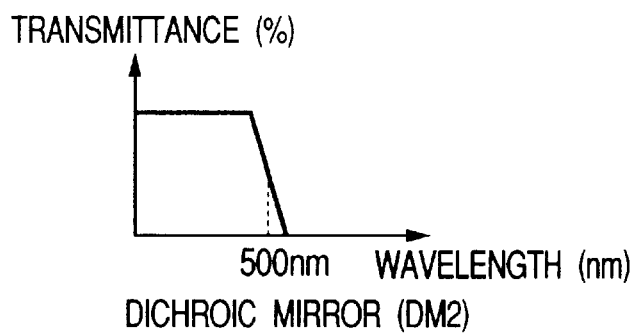
Figure 8C:
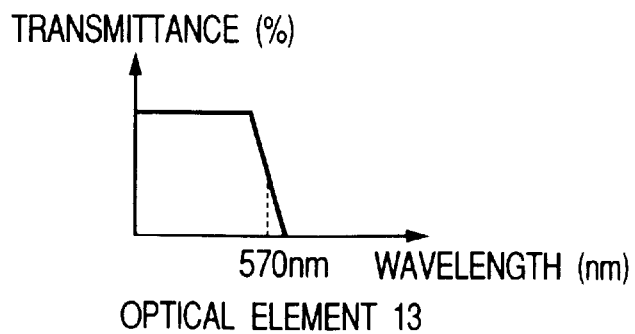

FIG. 7 shows the detailed arrangement of a projection-type display apparatus according to the second embodiment of the present invention. When the wavelength spectral characteristic of a dichroic mirror DM1 is changed to that shown in FIG. 8A, and the wavelength spectral characteristic of a dichroic mirror DM2 is changed to that shown in FIG. 8B, an optical element 13 having a wavelength spectral characteristic shown in FIG. 8C can be set immediately before the dichroic prism in the green wavelength optical path. This optical element 13 can also be set at any position between the dichroic mirror DM1 and the liquid crystal display element in the green wavelength optical path.

Figure 9A:
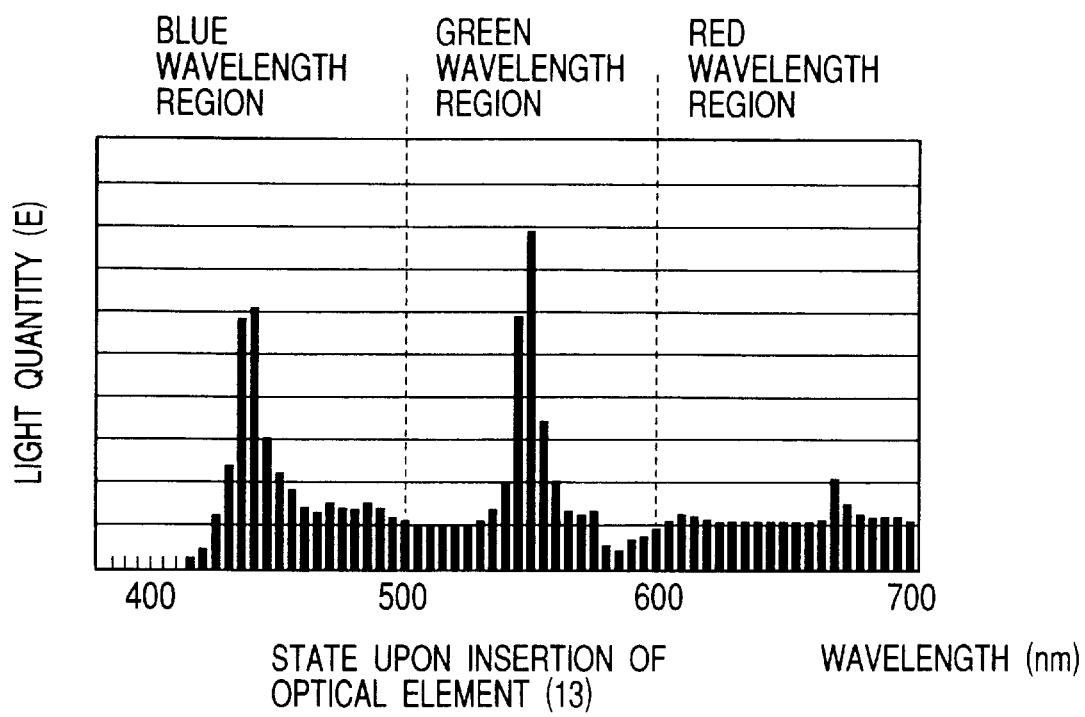
FIGS. 9A and 9B are graphs showing spectrum distributions in states upon and without insertion of the optical element 13 according to the second embodiment.
Figure 9B:
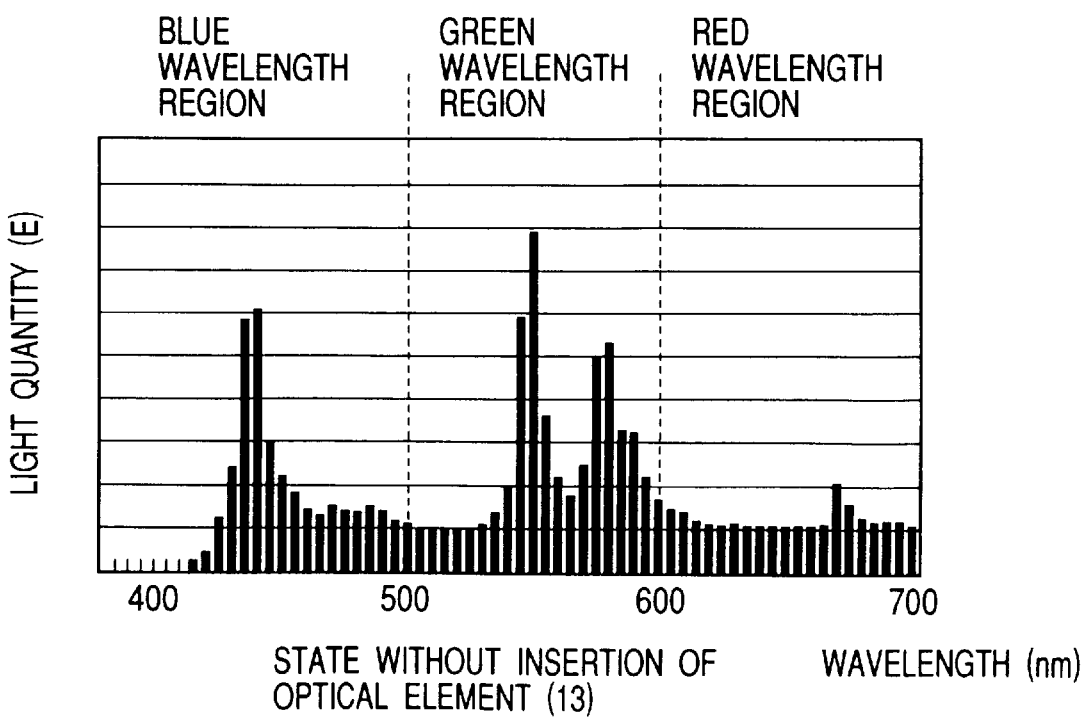

FIGS. 9A and 9B show spectrum characteristics in states upon and without insertion of the optical element 13. When the optical element 13 is inserted into the irradiation optical path, and a light component in the band of 570 to 600 nm is not used, the color purity can improve. Generally, however, when a light component that lowers the color purity is shielded, the light quantity decreases, although the color purity improves. For the optical element 13, the cut band and transmittance are set such that the color purity and color balance can be ensured without greatly decreasing the light quantity.

In the arrangement shown in FIG. 7, only the light component in the green wavelength region changes its light quantity, as shown in FIGS. 9A and 9B. Hence, transparent glass is used as the substrates of the polarizing plates in the blue and red wavelength regions, cooling by a cooing fan is done mainly for the blue and red wavelength regions, and sapphire is used as the substrate of the polarizing plate in the green wavelength region where the light quantity changes, the thermal load on the polarizing plates in the respective wavelength regions can be relaxed. In addition, since the number of sapphire substrates decreases, the cost can be reduced.

Furthermore, since cooling by the cooling fan need only be mainly done for the blue and red wavelength regions where the light quantity does not change, the power consumption and size of the fan can reduced, and the problem of noise is also relaxed. The spectral wavelength characteristics of the dichroic mirror DM1 are not limited to these characteristics. A plurality of optical elements may be used in accordance with the characteristics.

Referring to FIG. 7, two sapphire substrates G1 and G2 are used as the substrates of polarizing plates G1 and G2. However, the number of substrates is not limited to two. In addition, not sapphire but another material such as fluorite having a high thermal conductivity may be used. Furthermore, as shown in FIG. 17, instead of using a substrate 100 formed from a material such as sapphire or fluorite having a high thermal conductivity as the substrate of a polarizing plate, the substrate may be integrated with a display element. In this case, sapphire or fluorite can be used for both of the substrate of a polarizing plate and the display element or selectively used for only an optimum one of the polarizing plate and display element.

Third Embodiment

Figure 10:
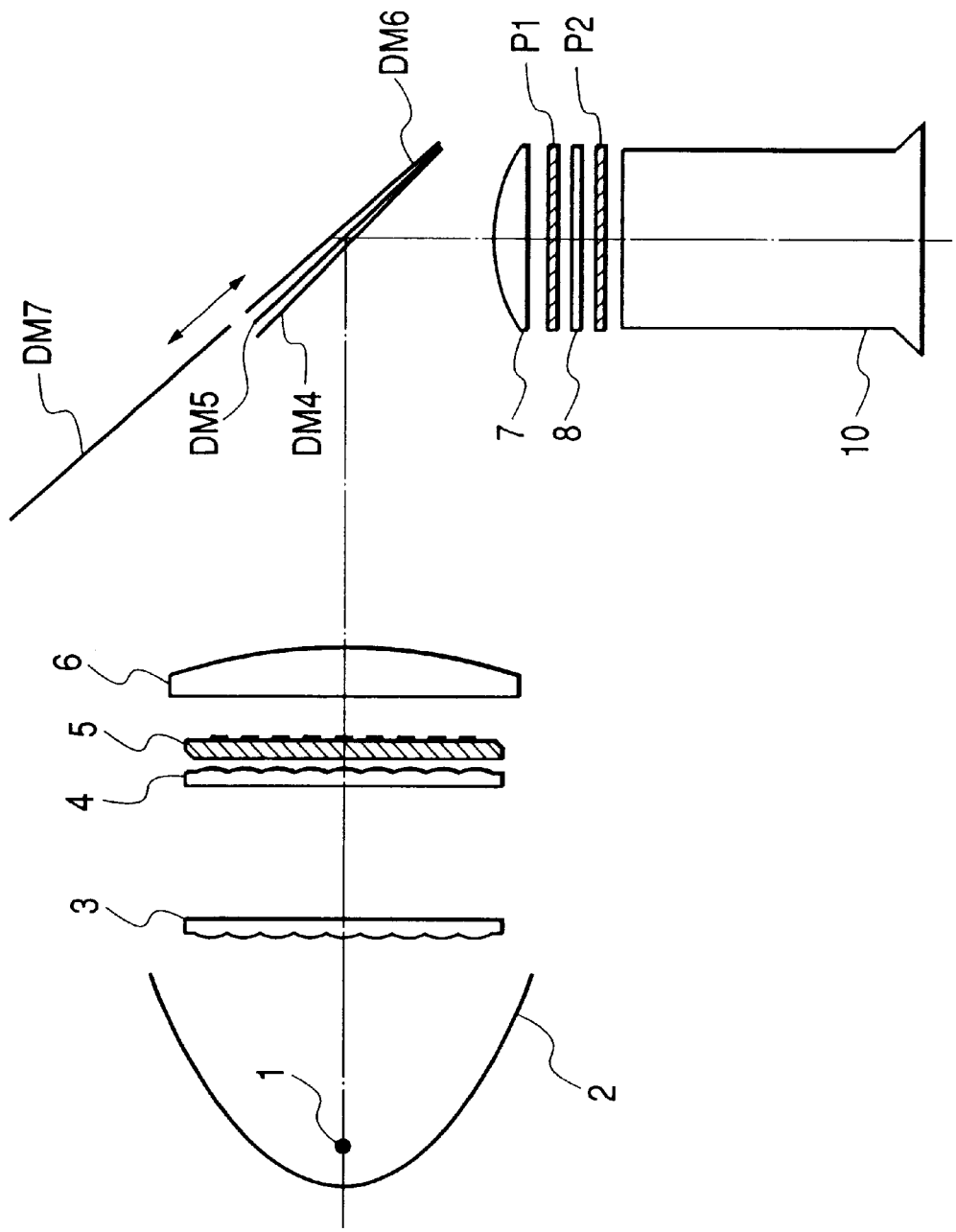
FIG. 10 is a view showing the arrangement using only one liquid crystal display element according to the third embodiment.
Figure 12:
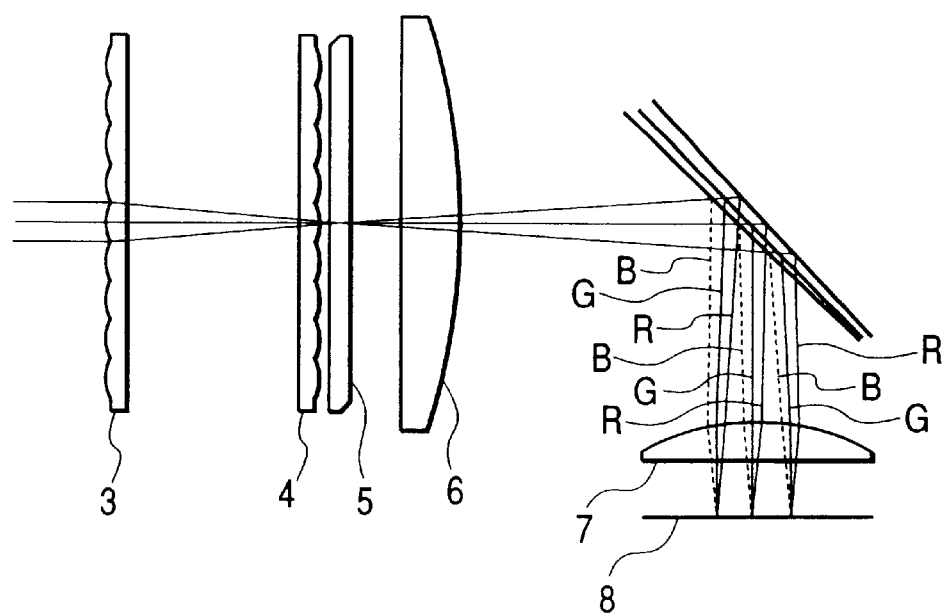
FIG. 12 is a schematic view of an optical path according to the third embodiment.
Figure 13:
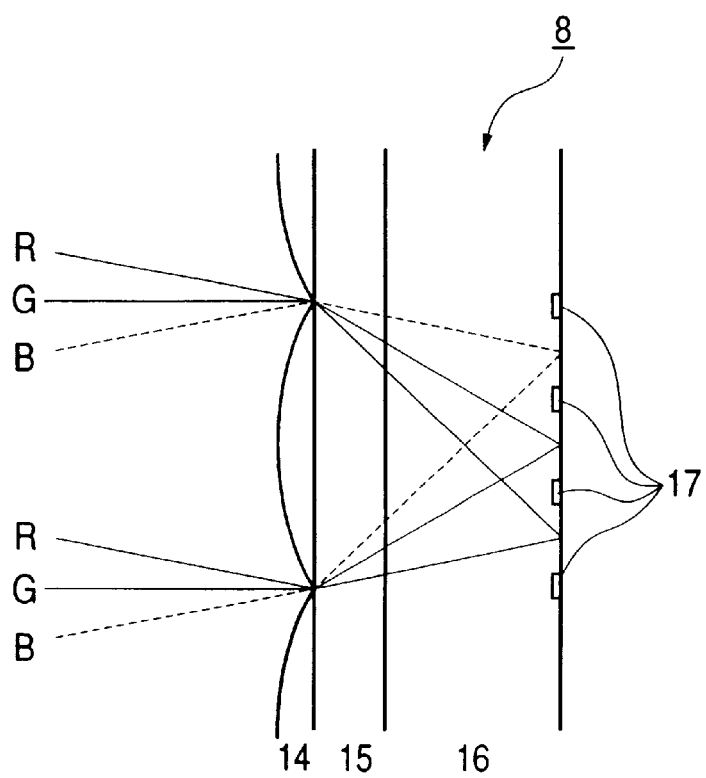
FIG. 13 is a view showing the internal structure and optical paths in a liquid crystal display element.

FIG. 10 shows the detailed arrangement of a projection-type display apparatus according to the third embodiment of the present invention. In the first and second embodiments, a plurality of liquid crystal display elements are used. However, the present invention is not limited to this, and color display can be realized using a single liquid crystal display element. This will be described next as the third embodiment of the present invention. FIGS. 11A to 11D show the spectral transmittances of dichroic mirrors DM4 to DM7 in the above arrangement. FIGS. 12 and 13 show, respectively, the outline of an optical path, and the internal structure and optical paths in a liquid crystal display element according to this embodiment.

Figure 14:
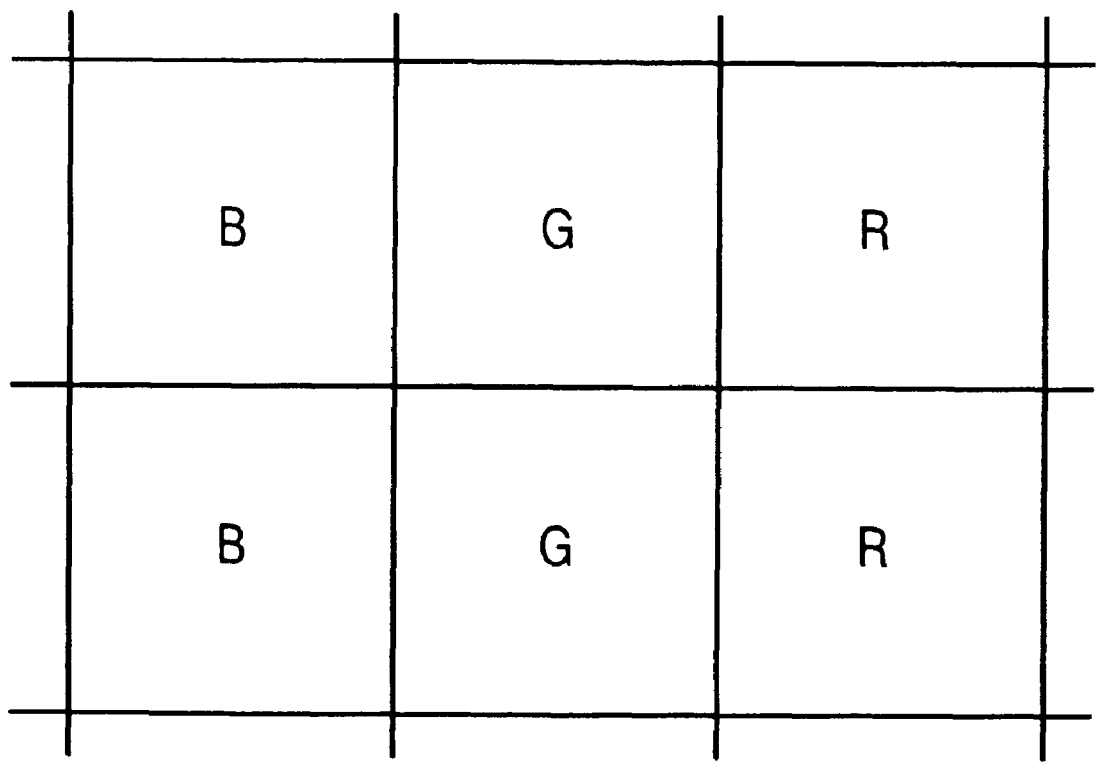
FIG. 14 is a view showing the positional relationship between color band light components and pixels of the liquid crystal display element according to the third embodiment.
Figure 15:
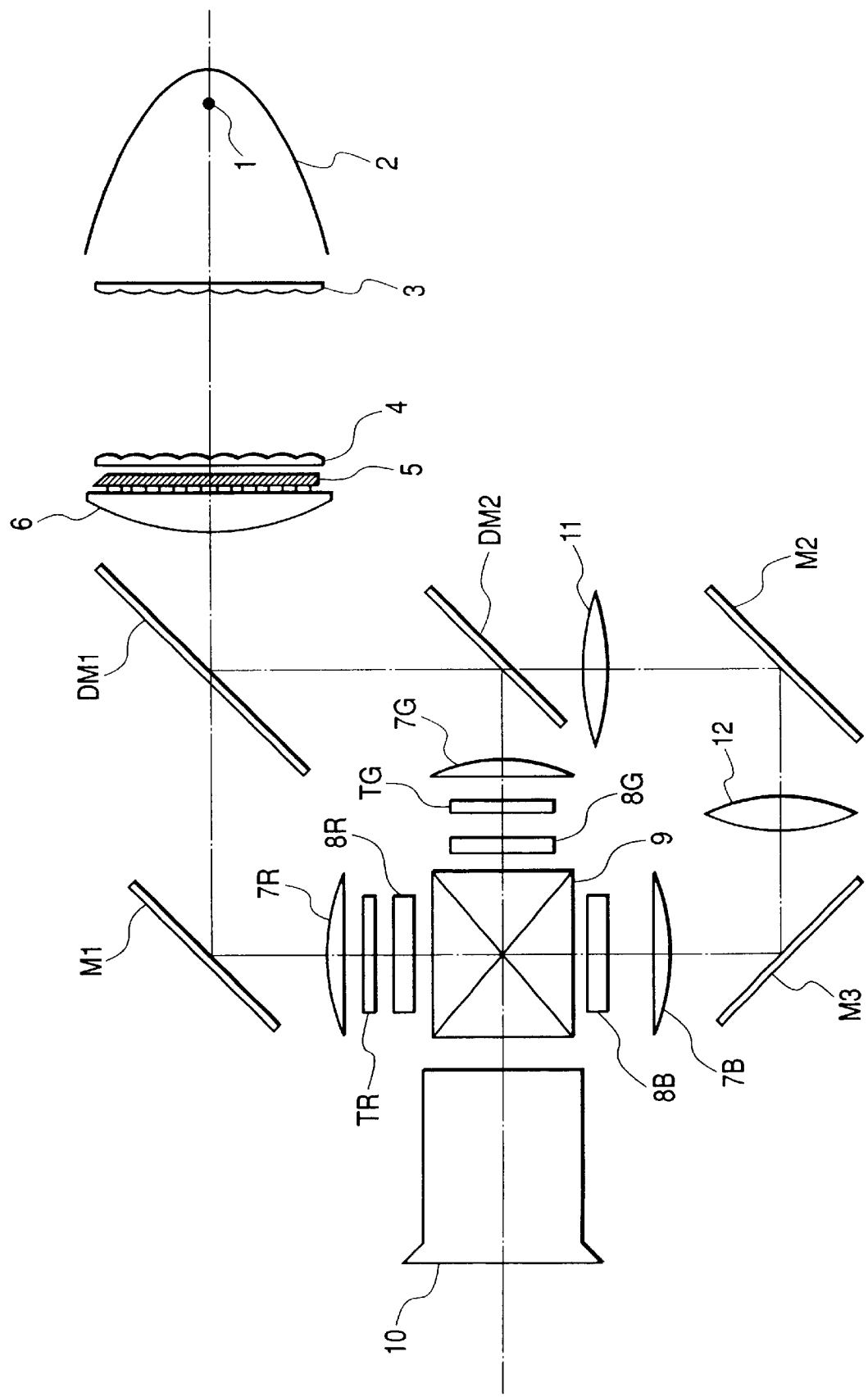
FIG. 15 is a view showing the arrangement of a conventional projection-type display apparatus.
Figure 16A:
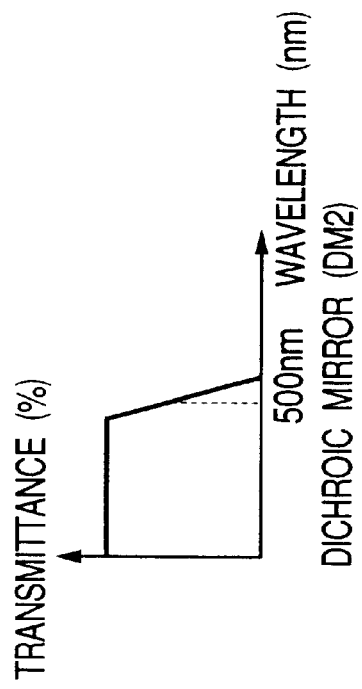
FIGS. 16A, 16B, 16C and 16D are graphs showing the wavelength spectral characteristics of dichroic mirrors and trimming filters of the conventional projection-type display apparatus.
Figure 16B:
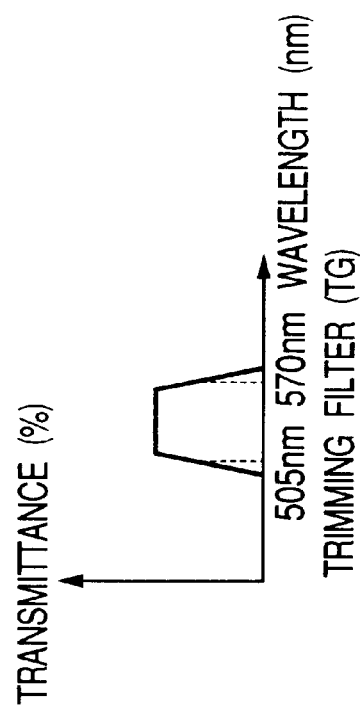
Figure 16C:
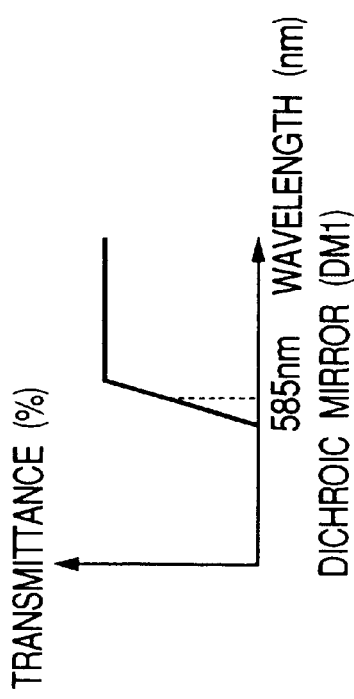
Figure 16D:
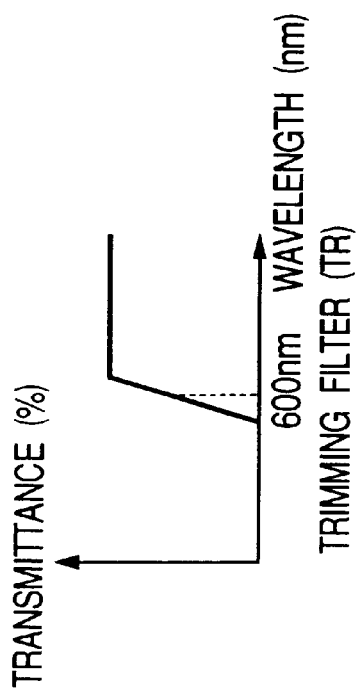

Light is separated into blue-, green-, and red-band light components by the dichroic mirrors DM4 to DM7 that exhibit the spectral reflectivities shown in FIGS. 11A to 11D, and a microlens array 14 placed on the light source section side of the liquid crystal display element 8 is irradiated with the blue-, green-, and red-band light components at different incident angles. A liquid crystal layer 16 of the liquid crystal display element 8 is divided into pixels corresponding to the blue-, green-, and red-band light components, as shown in FIG. 14, and these pixels are independently driven. The blue-, green-, and red-band light components pass through the microlens array 14 and enters corresponding pixels such that the pixels are divisionally irradiated with the light components in units of colors.

Figure 11B:
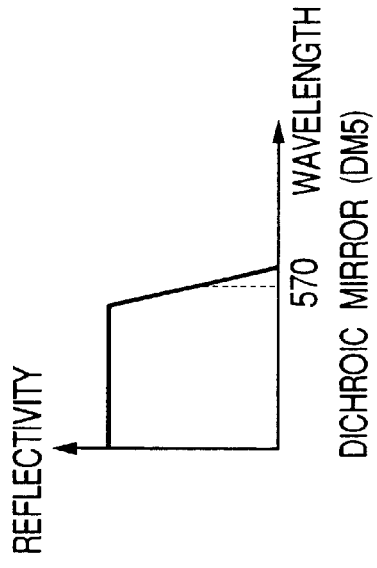
FIGS. 11A, 11B, 11C and 11D are graphs showing the wavelength spectral characteristics of the dichroic mirrors according to the third embodiment.
Figure 11D:
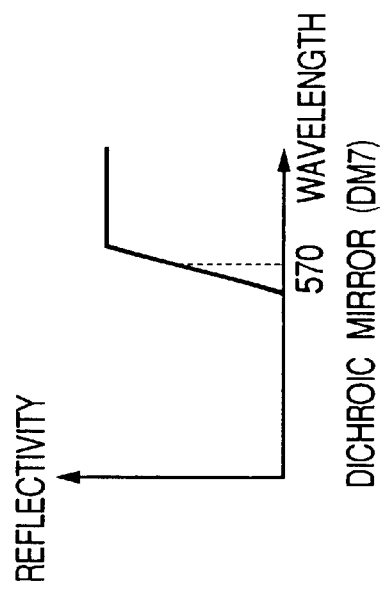
Figure 11A:
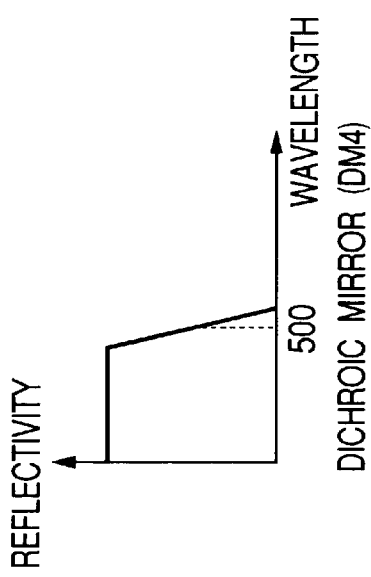
Figure 11C:
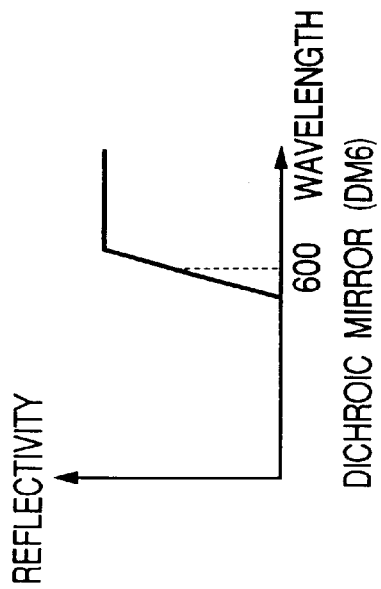

When the dichroic mirror DM6 having a spectral characteristic shown in FIG. 11C and the dichroic mirror DM7 having a spectral characteristic shown in FIG. 11D are replaced in the optical path, display with priority on the color reproducibility and display with priority on the brightness are realized by a single apparatus. When the dichroic mirror DM6 is in the optical path, display with priority on the color reproducibility is performed without using a light component in the band of 570 to 600 nm. When the dichroic mirror DM7 is in the optical path, display with priority on the brightness is performed using a light component in the band of 570 to 600 nm.

When sapphire substrates are used as the substrates of polarizing plates necessary before and after the liquid crystal display element, thermal load on the polarizing plates in display with priority on the brightness is reduced, and the power consumption of a cooling fan is also decreased. Instead of the dichroic mirror DM7, a typical metal mirror may be used.

As described above, when a mechanism for inserting and removing the optical element is used, display qualities of two types can be realized. The insertion and removal of the optical element can be done manually or by combining power generator and transmitter. In addition, when sapphire is used as the substrate of a polarizing plate, thermal load on the polarizing plate is relaxed.

Referring to FIG. 10, two sapphire substrates are used as the substrates of polarizing plates P1 and P2. However, the number of substrates is not limited to two. In addition, not sapphire but another material such as fluorite having a high thermal conductivity may be used. Furthermore, as shown in FIG. 17, instead of using a substrate 100 formed from a material such as sapphire or fluorite having a high thermal conductivity as the substrate of a polarizing plate, the substrate may be integrated with a display element. In this case, sapphire or fluorite can be used for both of the substrate of a polarizing plate and the display element or, a material having a high thermal conductivity such as sapphire, fluorite or the like may be selectively used for only an optimum portion of an element subject to thermal load such as the polarizing plate, display element or the like.

In the foregoing embodiments, sapphire or fluorite having a high thermal conductivity is used as a material for the substrate of the display element or the polarizing plate for the sake of example. Such material having a high thermal conductivity, however, is not limited to sapphire or fluorite. Diamond or any other materials may be used as long as those material have a high thermal conductivity.

Further, the substrate of the polarizing plate or the substrate of the display element may be made from two kinds of materials or more. In this case, plate-like members of two or more kinds of materials may be adhered together, or thin film of one material may be formed on a plate-like member of another material, or two or more kinds of materials may be mixed. On the other hand, in order to accomplish one of objects of the invention that thermal load is reduced, it is preferable that at least one of two or more kinds of materials has a thermal conductivity having 2 W/(m·k) or higher.

What is claimed is:

1. A display apparatus for forming a color image by illuminating one or a plurality of display elements with light from a light source and modulating a plurality of color light components having different colors by the display elements, comprising:
   means for changing a color purity of at least one of the plurality of color light components; and
   a polarizing plate having a transparent substrate including a material having a thermal conductivity higher than 2 W (m·K), said polarizing plate being provided only in an optical path of the light component whose color purity is changed by said color purity changing means.

2. An apparatus according to claim 1, wherein said color purity changing means can adjust whether a light component in a specific wavelength region reaches the display element.

3. An apparatus according to claim 2, wherein the light source has a peak at a certain wavelength of the specific wavelength region.

4. An apparatus according to claim 3, wherein the certain wavelength is 570 to 600 nm.

5. An apparatus according to claim 4, wherein the light source comprises a high-pressure mercury-vapor lamp, and the certain wavelength is about 580 nm.

6. An apparatus according to claim 2, wherein said color purity changing means comprises a dichroic mirror.

7. An apparatus according to claim 1, wherein the transparent substrate is essentially made of one of sapphire and fluorite.

8. An apparatus according to claim 1, wherein the transparent substrate includes a material having a thermal conductivity higher than 5 W/(m·K).

9. An apparatus according to claim 1, wherein the transparent substrate is essentially made of material having a thermal conductivity higher than 2 W/(m·K).

10. An apparatus according to claim 1, further comprising a plurality of dichroic mirrors for separating white light from the light source into the plurality of color light components having different colors.

11. An apparatus according to claim 10, further comprising
   a plurality of image elements arranged in correspondence with the plurality of color light components having different colors, and
   a plurality of dichroic mirrors for combining image light components from the plurality of display elements.

12. An apparatus according to claim 10, further comprising
   a plurality of display elements arranged in correspondence with the plurality of color light components having different colors, and
   a dichroic prism for combining image light components from the plurality of display elements for modulating the plurality of color light components.

13. An apparatus according to claim 12, wherein said dichroic prism is formed by bonding four prisms using an adhesive to have wavelength selection/reflection layers substantially perpendicular to each other.

14. An apparatus according to claim 1, wherein said color purity changing means inserts/removes an optical element to/from an optical path of at least one of the plurality of color light components or changes a posture of the optical element.

15. A projecting apparatus comprising:
   said display apparatus of claim 1; and
   a projection system for enlarging and projecting an image formed by said display apparatus.

16. An apparatus according to claim 1, wherein a polarizing plate provided in another optical path excepting said optical path of the light component whose color purity is changed by said color purity changing means has a transparent substrate whose thermal conductivity is 1 W (m·K).

17. An apparatus according to claim 1, wherein a display element provided in another optical path excepting said optical path of the light component whose color purity is changed by said color purity changing means has a transparent substrate whose thermal conductivity is 1 W (m·K).

18. A display apparatus for forming a color image by illuminating one or a plurality of display elements with light from a light source and modulating a plurality of color light components having different colors by the display elements, comprising:
   means for changing a color purity of at least one of the plurality of color light components,
   wherein one of the one or plurality of display element having a transparent substrate essentially made of a material having a thermal conductivity higher than 2 W (m·K), said one display element being provided only in an optical path of the light component whose color purity is changed by said color purity changing means.

19. An apparatus according to claim 18, wherein said color purity changing means can adjust whether a light component in a specific wavelength region reaches the display element.

20. An apparatus according to claim 19, wherein the light source has a peak at a certain wavelength of the specific wavelength region.

21. An apparatus according to claim 20, wherein the certain wavelength is 570 to 600 nm.

22. An apparatus according to claim 21, wherein the light source comprises a high-pressure mercury-vapor lamp, and the certain wavelength is about 580 nm.

23. An apparatus according to claim 19, wherein said color purity changing means comprises a dichroic mirror.

24. An apparatus according to claim 18, wherein the transparent substrate is essentially made of one of sapphire and fluorite.

25. An apparatus according to claim 18, wherein the transparent substrate includes a material having a thermal conductivity higher than 5 W/(m·K).

26. An apparatus according to claim 18, wherein the transparent substrate is essentially made of a material having a thermal conductivity higher than 2 W/(m·K).

27. An apparatus according to claim 18, further comprising a plurality of dichroic mirrors for separating white light from the light source into the plurality of color light components having different colors.

28. An apparatus according to claim 18, further comprising
a plurality of image elements arranged in correspondence with the plurality of color light components having different colors, and
a plurality of dichroic mirrors for synthesizing image light components from the plurality of display elements.

29. An apparatus according to claim 18, further comprising
a plurality of display elements arranged in correspondence with the plurality of color light components having different colors, and
a dichroic prism for synthesizing image light components from the plurality of display elements for modulating the plurality of color light components.

30. An apparatus according to claim 18, wherein said dichroic prism is formed by bonding four prisms using an adhesive to have wavelength selection/reflection layers substantially perpendicular to each other.

31. An apparatus according to claim 18, wherein said color purity changing means inserts/removes an optical element to/from an optical path of at least one of the plurality of color light components or changes a posture of the optical element.

32. A projecting apparatus comprises:
said display apparatus of claim 18; and
a projection system for enlarging and projecting an image formed by said display apparatus.

33. A display element comprising:
a driving section for driving said display element, and
a fluorite substrate integrated with the display element.

34. A display apparatus comprising:
a display element including a driving section for driving said display element and a fluorite substrate integrated with the display element; and
an optical system for illuminating the display element with light from a light source.

35. A display apparatus for forming a color image by illuminating a plurality of display elements with light from a light source and modulating a plurality of color light components having different colors by the display elements, comprising:
means for changing a color purity of at least one of the plurality of color light components; and
a polarizing plate having a transparent substrate including a material having a thermal conductivity higher than 2 W/(m·K), said polarizing plate being provided in an optical path of the light component whose color purity is changed by said color purity changing means.

36. An apparatus according to claim 35, wherein said color purity changing means can adjust whether a light component in a specific wavelength region reaches the display element.

37. An apparatus according to claim 36, wherein the light source has a peak at a certain wavelength of the specific wavelength region.

38. An apparatus according to claim 37, wherein the certain wavelength is 570 to 600 nm.

39. An apparatus according to claim 38, wherein the light source comprises a high-pressure mercury-vapor lamp, and the certain wavelength is about 580 nm.

40. An apparatus according to claim 36, wherein said color purity changing means comprises a dichroic mirror.

41. An apparatus according to claim 35, wherein the transparent substrate is essentially made of one of sapphire and fluorite.

42. An apparatus according to claim 35, wherein the transparent substrate includes a material having a thermal conductivity higher than 5 W/(m·K).

43. An apparatus according to claim 35, wherein the transparent substrate is essentially made of material having a thermal conductivity higher than 2 W/(m·K).

44. An apparatus according to claim 35, further comprising a plurality of dichroic mirrors for separating white light from the light source into the plurality of color light components having different colors.

45. An apparatus according to claim 44, further comprising:
a plurality of image elements arranged in correspondence with the plurality of color light components having different colors, and
a plurality of dichroic mirrors for combining image light components from the plurality of display elements.

46. An apparatus according to claim 44, further comprising:
a plurality of display elements arranged in correspondence with the plurality of color light components having different colors, and
a dichroic prism for combining image light components from the plurality of display elements for modulating the plurality of color light components.

47. An apparatus according to claim 46, wherein said dichroic prism is formed by bonding four prisms using an adhesive to have wavelength selection/reflection layers substantially perpendicular to each other.

48. An apparatus according to claim 35, wherein said color purity changing means inserts/removes an optical element to/from an optical path of at least one of the plurality of color light components or changes a posture of the optical element.

49. A projecting apparatus comprising:
said display apparatus of claim 35; and
a projection system for enlarging and projecting an image formed by said display apparatus.

50. An apparatus according to claim 35, wherein a polarizing plate provided in another optical path excepting said optical path of the light component whose color purity is changed by said color purity changing means has a transparent substrate whose thermal conductivity is 1 W (m·K).

51. A display apparatus for forming a color image by illuminating one or a plurality of display elements with light from a light source and modulating a plurality of color light components having different colors by the display elements, comprising:

means for changing a color purity of at least one of the plurality of color light components, wherein one of the one or plurality of display element having a transparent substrate essentially made of a material having a thermal conductivity higher than 2 W (m·K), said one display element being provided in an optical path of the light component whose color purity is changed by said color purity changing means.

52. An apparatus according to claim 51, wherein said color purity changing means can adjust whether a light component in a specific wavelength region reaches the display element.

53. An apparatus according to claim 52, wherein the light source has a peak at a certain wavelength of the specific wavelength region.

54. An apparatus according to claim 53, wherein the certain wavelength is 570 to 600 nm.

55. An apparatus according to claim 54, wherein the light source comprises a high-pressure mercury-vapor lamp, and the certain wavelength is about 580 nm.

56. An apparatus according to claim 52, wherein said color purity changing means comprises a dichroic mirror.

57. An apparatus according to claim 51, wherein the transparent substrate is essentially made of one of sapphire and fluorite.

58. An apparatus according to claim 51, wherein the transparent substrate includes a material having a thermal conductivity higher than 5 W/(m·K).

59. An apparatus according to claim 51, wherein the transparent substrate is essentially made of a material having a thermal conductivity higher than 2 W/(m·K).

60. An apparatus according to claim 51, further comprising a plurality of dichroic mirrors for separating white light from the light source into the plurality of color light components having different colors.

61. An apparatus according to claim 51, further comprising:

a plurality of image elements arranged in correspondence with the plurality of color light components having different colors, and a plurality of dichroic mirrors for synthesizing image light components from the plurality of display elements.

62. An apparatus according to claim 51, further comprising:

a plurality of display elements arranged in correspondence with the plurality of color light components having different colors, and a dichroic prism for synthesizing image light components from the plurality of display elements for modulating the plurality of color light components.

63. An apparatus according to claim 51, wherein said dichroic prism is formed by bonding four prisms using an adhesive to have wavelength selection/reflection layers substantially perpendicular to each other.

64. An apparatus according to claim 51, wherein said color purity changing means inserts/removes an optical element to/from an optical path of at least one of the plurality of color light components or changes a posture of the optical element.

65. A projecting apparatus comprises:

said display apparatus of claim 51; and a projection system for enlarging and projecting an image formed by said display apparatus.

66. An apparatus according to claim 51, wherein a display element provided in another optical path excepting said optical path of the light component whose color purity is changed by said color purity changing means has a transparent substrate whose thermal conductivity is 1 W (m·K).

67. An apparatus according to claim 51, wherein a display element provided in another optical path excepting said optical path of the light component whose color purity is changed by said color purity changing means has a transparent substrate whose thermal conductivity is 1 W (m·K).

* * * * *